United States Patent
Hammou

(10) Patent No.: US 11,613,314 B2
(45) Date of Patent: Mar. 28, 2023

(54) WEIGHT SENSING ASSEMBLY

(71) Applicant: Taibi Khayyi Hammou, Aurora, IL (US)

(72) Inventor: Taibi Khayyi Hammou, Aurora, IL (US)

(*) Notice: Subject to any disclaimer, the term of this patent is extended or adjusted under 35 U.S.C. 154(b) by 364 days.

(21) Appl. No.: 16/933,478

(22) Filed: Jul. 20, 2020

(65) Prior Publication Data

US 2022/0017160 A1 Jan. 20, 2022

(51) Int. Cl.
*B62D 53/06* (2006.01)
*B60G 17/0165* (2006.01)

(52) U.S. Cl.
CPC ....... *B62D 53/068* (2013.01); *B60G 17/0165* (2013.01); *B60G 2400/52* (2013.01); *B60G 2400/61* (2013.01)

(58) Field of Classification Search
CPC .............. B62D 53/068; B60G 17/0165; B60G 2400/52; B60G 2400/61; B60G 17/0182; B60C 23/009
See application file for complete search history.

(56) References Cited

U.S. PATENT DOCUMENTS

| | | | | |
|---|---|---|---|---|
| 4,468,650 A | * | 8/1984 | Barbee | B60C 23/0433 340/447 |
| 4,816,802 A | * | 3/1989 | Doerksen | B60C 23/0433 340/447 |
| 4,978,941 A | * | 12/1990 | Brown | B60C 23/009 340/447 |
| 5,025,877 A | * | 6/1991 | Assh | B62D 53/068 180/209 |
| 5,130,694 A | * | 7/1992 | Zainaleian | B60C 23/0422 340/442 |
| 5,573,611 A | * | 11/1996 | Koch | B60C 23/0493 73/146 |
| 5,884,238 A | | 3/1999 | Noll | |
| 6,036,179 A | * | 3/2000 | Rensel | B60C 23/0483 340/447 |
| 6,046,672 A | * | 4/2000 | Pearman | B60C 23/041 340/447 |
| D428,362 S | | 7/2000 | Mantle | |

(Continued)

FOREIGN PATENT DOCUMENTS

WO WO201703152 3/2017

*Primary Examiner* — Paul N Dickson
*Assistant Examiner* — Kurtis Nielson

(57) ABSTRACT

A weight sensing assembly for a semi-trailer truck enabling balancing of a load includes a sensing module, which is one of a plurality thereof. The sensing modules are mountable to wheels of the semi-trailer truck so that each axle has a sensing module engaged to outside wheels thereof. The sensing module obtains a pressure measurement of a tire engaged to the wheel and transmits it to an electronic device. Programming code on the electronic device enables it to utilize a pressure change, upon positioning of a load upon the semi-trailer truck, to determine a weight that is positioned upon an associated axle. The electronic device calculates adjustments to positions of a sliding fifth wheel and of sliding tandems of the semi-trailer truck to obtain positions thereof that will achieve a legal weight distribution of the load. The electronic device presents, upon a screen thereof, the adjustments to a user.

7 Claims, 3 Drawing Sheets

(56) References Cited

U.S. PATENT DOCUMENTS

| | | | |
|---|---|---|---|
| 6,357,777 B1 * | 3/2002 | Linger | B62D 53/0807 |
| | | | 280/441 |
| 6,363,331 B1 | 3/2002 | Kyrtsos | |
| 6,384,716 B1 | 5/2002 | Eckelberry | |
| 6,769,315 B2 | 8/2004 | Srevenson | |
| 6,921,100 B2 * | 7/2005 | Mantini | B60G 17/005 |
| | | | 280/407.1 |
| 7,072,763 B2 | 7/2006 | Saxon | |
| 7,154,414 B2 * | 12/2006 | King | B60C 23/0416 |
| | | | 73/146 |
| 7,404,466 B2 | 7/2008 | Diehl | |
| 8,421,611 B1 | 4/2013 | Coshow | |
| 10,543,849 B2 * | 1/2020 | Jankowski | B60W 30/04 |
| 2007/0017715 A1 | 1/2007 | McCann | |
| 2019/0353561 A1 * | 11/2019 | Landolsi | B60G 17/0195 |

* cited by examiner

WEIGHT SENSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to weight sensing assemblies and more particularly pertains to a new weight sensing assembly for a semi-trailer truck enabling balancing of a load positioned thereupon.

(2) Description of Related Art Including Information Disclosed Under 37 CFR 1.97 and 1.98

The prior art relates to weight sensing assemblies. Prior art weight sensing assemblies may comprise cab mounted indicator lights, load distribution sensing modules, and the like.

BRIEF SUMMARY OF THE INVENTION

An embodiment of the disclosure meets the needs presented above by generally comprising a sensing module, which is one of a plurality of the sensing modules. Each of the sensing modules is configured to be mountable to a respective one of a plurality of wheels of a semi-trailer truck so that each axle of the semi-trailer truck has a sensing module engaged to outside wheels thereof. The sensing module is configured to obtain a pressure measurement of a tire engaged to the wheel and to transmit the pressure measurement to an electronic device.

Programming code that is selectively positionable on the electronic device enables the electronic device to utilize a change in the pressure measurement for the tire, upon positioning of a load upon the semi-trailer truck, to determine a weight that is positioned upon an associated axle. The programming code enables the electronic device to calculate adjustments to positions of a sliding fifth wheel and of sliding tandems of the semi-trailer truck to obtain positions thereof that will achieve a legal weight distribution of the load. The programming code also enables the electronic device to present, upon a screen thereof, the adjustments to a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
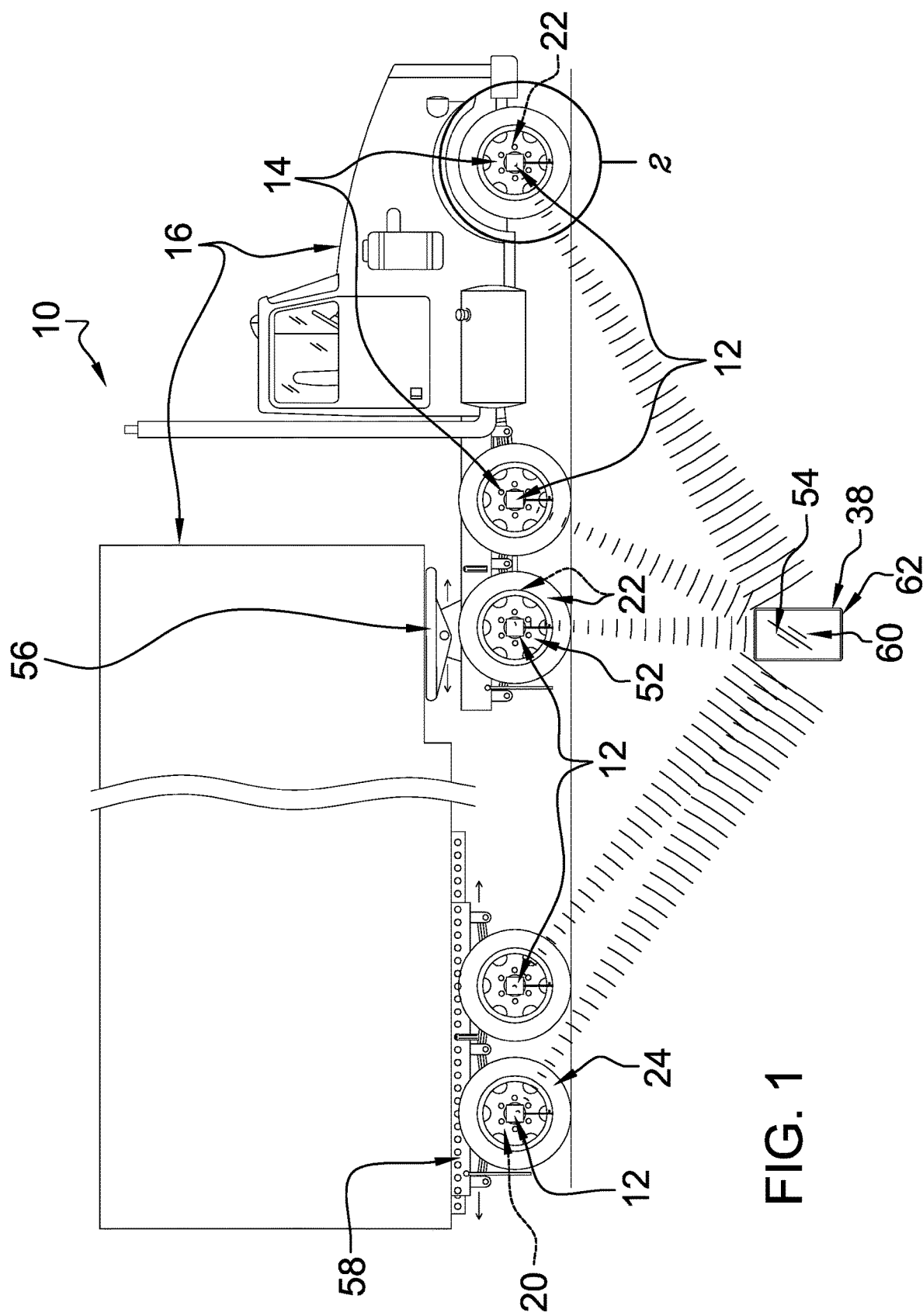
FIG. 1 is an in-use view of a weight sensing assembly according to an embodiment of the disclosure.
Figure 2:
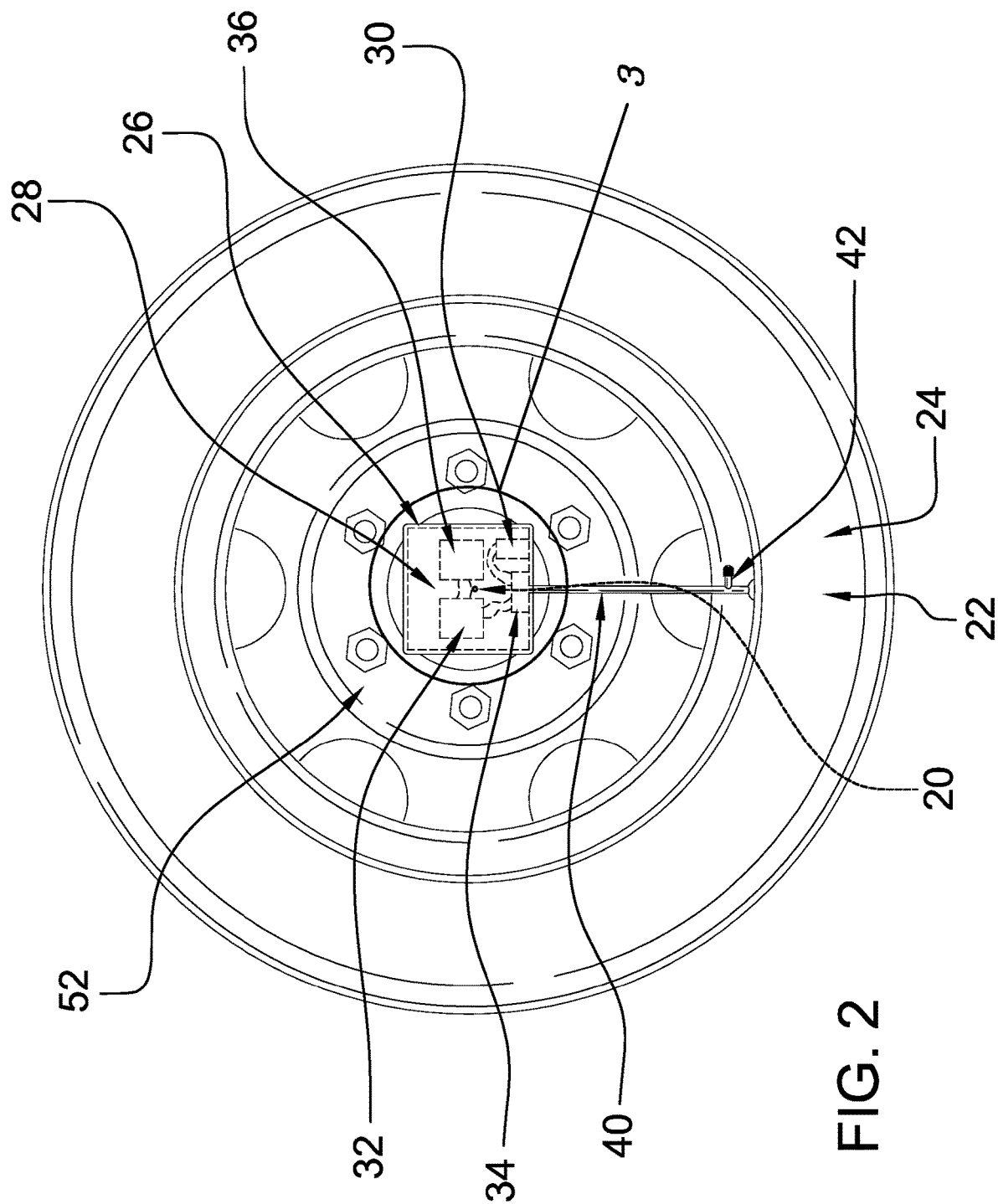
FIG. 2 is a detail view of an embodiment of the disclosure.
Figure 3:
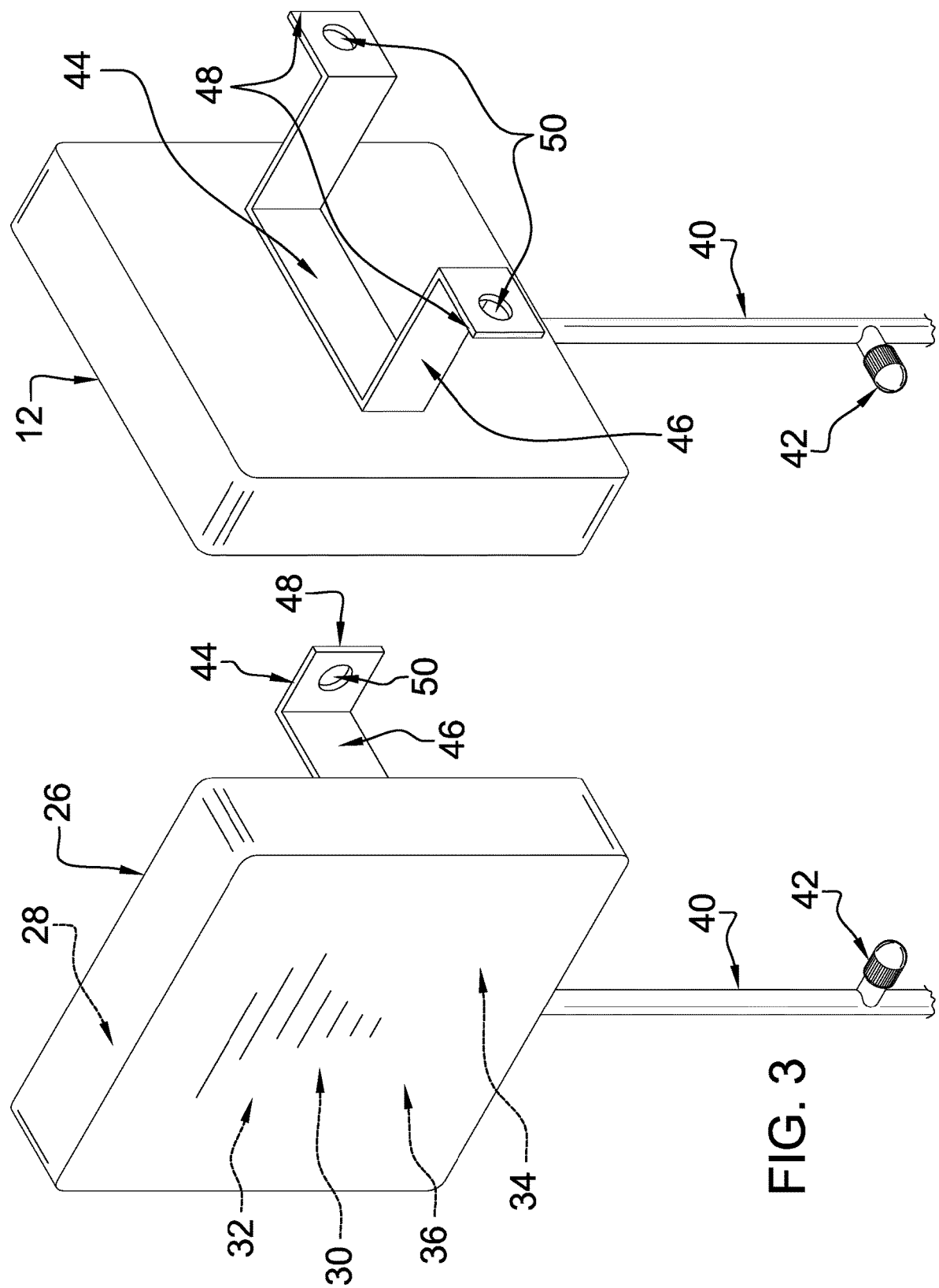
FIG. 3 is an isometric perspective view of an embodiment of the disclosure.

With reference now to the drawings, and in particular to FIGS. 1 through 3 thereof, a new weight sensing assembly embodying the principles and concepts of an embodiment of the disclosure and generally designated by the reference numeral 10 will be described.

As best illustrated in FIGS. 1 through 3, the weight sensing assembly 10 generally comprises a sensing module 12, which is one of a plurality of the sensing modules 12. Each of the sensing modules 12 is configured to be mountable to a respective one of a plurality of wheels 14 of a semi-trailer truck 16 so that each axle 20 of the semi-trailer truck 16 has a sensing module 12 engaged to outside wheels 22 thereof, as shown in FIG. 1. The sensing module 12 is configured to obtain a pressure measurement of a tire 24 engaged to the wheel 14 and to transmit the pressure measurement to an electronic device 38.

The sensing module 12 comprises a housing 26, which defines an interior space 28. A battery 30, a microprocessor 32, a sensor 34, and a transmitter 36 are engaged to the housing 26 and are positioned in the interior space 28. The microprocessor 32 is operationally engaged to the battery 30, the sensor 34, and the transmitter 36. The sensor 34 is configured to measure pressure and to relay the pressure measurement to the microprocessor 32. The microprocessor 32 is positioned to selectively actuate the transmitter 36 to transmit the pressure measurement to the electronic device 38.

A tube 40, which is engaged to the sensor 34 and which extends from the housing 26, is configured to engage a valve stem 42 of the tire 24 so that the tube 40 is in fluidic communication with the tire 24. The tube 40 may be directly engaged to the tire 24 with the valve stem 42 being engaged to the tube 40 proximate to the tire 24, as shown in FIG. 2.

A connector 44 is engaged to the housing 26 and is configured to engage a respective wheel 14 of the semi-trailer truck 16 so that the sensing module 12 is mounted to the respective wheel 14. The connector 44 may comprise bracket 46, as shown in FIG. 3. The bracket 46 has opposed ends 48. The bracket 46 has a pair of holes 50 positioned therein, with each hole 50 being positioned proximate to a respective opposed end 48. The hole 50 is positioned to be aligned with a respective orifice (not shown) that is positioned in a hub 52 of the wheel 14. The hole 50 and the respective orifice are positioned for insertion of a fastener (not shown) to fasten the housing 26 to the hub 52.

The present invention anticipates the connector 44 comprising other connecting means, such as, but not limited to, magnets, adhesives, welds, and the like.

Programming code 54 that is selectively positionable on the electronic device 38 enables the electronic device 38 to utilize a change in the pressure measurement for the tire 24, upon positioning of a load upon the semi-trailer truck 16, to determine a weight that is positioned upon an associated axle 20. The programming code 54 enables the electronic device 38 to calculate adjustments to positions of a sliding fifth wheel 56 and of sliding tandems 58 of the semi-trailer truck 16 to obtain positions thereof that will achieve a legal weight distribution of the load.

The programming code 54 also enables the electronic device 38 to present, upon a screen 60 thereof, the adjustments to a user. The present invention also anticipates the programming code 54 commanding the electronic device 38 to communicate the actual weight distribution to a computer (not shown), such as one located in an office having responsibility for one or both of the load and the semi-trailer truck 16.

In use, the sensing modules 12 are engaged to the outside wheels 22 of each axle 20 and the programming code 54 is positioned on the electronic device 38, such as a cellular phone 62. The electronic device 38 assesses the change in pressure of the tires 24 when the load is positioned on the semi-trailer truck 16 and calculates positions of the sliding fifth wheel 56 and of the sliding tandems 58 of that will achieve a legal weight distribution of the load. These positions are communicated to the user upon the screen 60 of the electronic device 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A weight sensing assembly comprising:
   a sensing module, the sensing module being one of a plurality of sensing modules, each of the sensing modules being configured to be mountable to a respective one of a plurality of wheels of a semi-trailer truck such that each axle of the semi-trailer truck has a sensing module engaged to outside wheels thereof, the sensing module being configured for obtaining a pressure measurement of a tire engaged to the wheel and for transmitting the pressure measurement to an electronic device; and
   programming code selectively positionable on the electronic device enabling the electronic device to utilize a change in the pressure measurement for the tire upon positioning of a load upon the semi-trailer truck for determining a weight positioned upon an associated axle, for enabling the electronic device to calculate adjustments to positions of a sliding fifth wheel and sliding tandems of the semi-trailer truck for obtaining positions thereof to achieve a legal weight distribution of the load, and for enabling the electronic device to present, upon a screen thereof, the adjustments to a user; and
   wherein each sensing module comprises:
     a housing defining an interior space;
     a battery engaged to the housing and positioned in the interior space;
     a microprocessor engaged to the housing and positioned in the interior space, the microprocessor being operationally engaged to the battery;
     a sensor engaged to the housing and positioned in the interior space, the sensor being operationally engaged to the microprocessor, the sensor being configured for measuring pressure and for relaying the pressure measurement to the microprocessor;
     a transmitter engaged to the housing and positioned in the interior space, the transmitter being operationally engaged to the microprocessor such that the microprocessor is positioned for selectively actuating the transmitter for transmitting the pressure measurement to the electronic device; and
     a tube engaged to the sensor and extending from the housing, the tube being configured for engaging a valve stem of the tire such that the tube is in fluidic communication with the tire.

2. The weight sensing assembly of claim 1, wherein the tube is engaged to the tire, the valve stem being engaged to the tube proximate to the tire.

3. The weight sensing assembly of claim 1, further including a connector engaged to the housing and being configured for engaging a respective wheel of the semi-trailer truck such that the sensing module is mounted to the respective wheel.

4. The weight sensing assembly of claim 3, wherein the connector comprises a bracket having opposed ends, the bracket having a pair of holes positioned therein, each hole being positioned proximate to a respective opposed end such that the hole is positioned for aligning with a respective orifice positioned in a hub of the wheel, wherein the hole and the respective orifice are positioned for insertion of a fastener for fastening the housing to the hub.

5. A weight sensing assembly and semi-trailer truck combination comprising:
   a semi-trailer truck comprising a plurality of wheels engaged to a plurality of axles, each wheel having a tire engaged thereto;

a sensing module, the sensing module being one of a plurality of sensing modules, each of the sensing modules being mounted to a respective one of the wheels such that each axle has a sensing module engaged to outside wheels thereof, the sensing module being configured for obtaining a pressure measurement of an associated tire and for transmitting the pressure measurement; and an electronic device having programming code positioned thereupon enabling the electronic device to utilize a change in the pressure measurement for the tire upon positioning of a load upon the semi-trailer truck for determining a weight positioned upon an associated axle, for enabling the electronic device to calculate adjustments to positions of a sliding fifth wheel and sliding tandems of the semi-trailer truck for obtaining positions thereof to achieve a legal weight distribution of the load, and for enabling the electronic device to present, upon a screen thereof, the adjustments to a user; and wherein each sensing module comprises:
a housing defining an interior space;
a battery engaged to the housing and positioned in the interior space;
a microprocessor engaged to the housing and positioned in the interior space, the microprocessor being operationally engaged to the battery;
a sensor engaged to the housing and positioned in the interior space, the sensor being operationally engaged to the microprocessor, the sensor being configured for measuring pressure and for relaying the pressure measurement to the microprocessor;
a transmitter engaged to the housing and positioned in the interior space, the transmitter being operationally engaged to the microprocessor such that the microprocessor is positioned for selectively actuating the transmitter for transmitting the pressure measurement to the electronic device; and
a tube engaged to the sensor and extending from the housing, the tube being engaged a valve stem of the tire such that the tube is in fluidic communication with the tire.

6. The weight sensing assembly of claim 5, wherein the tube is engaged to the tire, the valve stem being engaged to the tube proximate to the tire.

7. A weight sensing assembly comprising:
a sensing module, the sensing module being one of a plurality of sensing modules, each of the sensing modules being configured to be mountable to a respective one of a plurality of wheels of a semi-trailer truck such that each axle of the semi-trailer truck has a sensing module engaged to outside wheels thereof, the sensing module being configured for obtaining a pressure measurement of a tire engaged to the wheel and for transmitting the pressure measurement to an electronic device, the sensing module comprising:
a housing defining an interior space,
a battery engaged to the housing and positioned in the interior space,
a microprocessor engaged to the housing and positioned in the interior space, the microprocessor being operationally engaged to the battery,
a sensor engaged to the housing and positioned in the interior space, the sensor being operationally engaged to the microprocessor, the sensor being configured for measuring pressure and for relaying the pressure measurement to the microprocessor,
a transmitter engaged to the housing and positioned in the interior space, the transmitter being operationally engaged to the microprocessor such that the microprocessor is positioned for selectively actuating the transmitter for transmitting the pressure measurement to the electronic device, and
a tube engaged to the sensor and extending from the housing, the tube being configured for engaging a valve stem of the tire such that the tube is in fluidic communication with the tire, the tube being engaged to the tire, the valve stem being engaged to the tube proximate to the tire;

a connector engaged to the housing and being configured for engaging a respective wheel of the semi-trailer truck such that the sensing module is mounted to the respective wheel, the connector comprising a bracket having opposed ends, the bracket having a pair of holes positioned therein, each hole being positioned proximate to a respective opposed end such that the hole is positioned for aligning with a respective orifice positioned in a hub of the wheel, wherein the hole and the respective orifice are positioned for insertion of a fastener for fastening the housing to the hub; and programming code selectively positionable on the electronic device enabling the electronic device to utilize a change in the pressure measurement for the tire upon positioning of a load upon the semi-trailer truck for determining a weight positioned upon an associated axle, for enabling the electronic device to calculate adjustments to positions of a sliding fifth wheel and sliding tandems of the semi-trailer truck for obtaining positions thereof to achieve a legal weight distribution of the load, and for enabling the electronic device to present, upon a screen thereof, the adjustments to a user.

* * * * *